3,647,551
METHOD OF MAKING A POROUS CARBON MATERIAL

Madison W. Reed, Jr., Fort Worth, and Warren C. Schwemer, Arlington, Tex., assignors to Advanced Technology Center, Inc., Grand Prairie, Tex.
No Drawing. Filed Nov. 7, 1966, Ser. No. 592,306
Int. Cl. H01m *13/04*
U.S. Cl. 136—122                                26 Claims

ABSTRACT OF THE DISCLOSURE

A method of making a monolithic carbon material having a metallic activator or the like uniformly distributed throughout the finished material, including the steps of preparing a dry mixture of polyvinylidene chloride and the desired metallic activator (or a precursor therefor), and then pyrolyzing the mixture. The carbon material may be used as a battery electrode, fuel cell electrode, etc., and the metallic activator is selected from the group including tungsten, silver, gold, copper, tantalum, nickel, etc. An optional step in the process involves grinding a mixture of particles of polyvinylidene chloride and a desired metal with pieces of solid carbon dioxide so that the polyvinylidene chloride will be reduced in size and not just deformed during grinding.

---

This invention relates to porous carbon material and in particular to a method of making porous carbon material from polyvinylidene chloride.

Porous carbon material using polyvinylidene chloride $(CH_2CCl_2)_x$, as a carbon precursor shows promise since the controlled thermal decomposition of $(CH_2CCl_2)_x$ gives a stoichiometric yield of carbon free from the impurities usually found in carbon from natural sources. The superior corrosion resistance of carbonized polyvinylvinylidene chloride over carbons from a natural precursor is, perhaps, the result of the lower impurity level and the homogeneous, isotropic structure of carbon produced from polyvinylidene chloride. Carbonized $(CH_2CCl_2)_x$ is characterized by toughness and strength which carbons from a natural precursor of equal density do not exhibit.

Polyvinylidene chloride has also been found to be an ideal material to carbonize for use as a porous electrode. Electrodes from carbonized polyvinylidene chloride have all the desirable characteristics of electrodes of carbon from a natural precursor including the large surface contact area occasioned by the irregular surface of carbon particles. In the past, however, the last step in the production of an electrode made from carbonized $$(CH_2CCl_2)_x$$

was coating with an activated metal catalyst which is an extremely difficult operation. The coating has to be uniform and in addition has to be applied without blocking or flooding the porous surface. Further, the coating process is extremely difficult to carry out without cracking the carbon pate. A further disadvantage of applying the catalytic material to the carbonized polyvinylidene chloride is the possibility of producing a non-uniform distribution of the catalyst throughout the porous material. The process of coating carbonized $(CH_2CCl_2)_x$ with a catalytic material usually results in an excessive use of said material. Catalytic materials used in the production of porous electrodes are often costly and difficult to obtain. Economically, the excessive uses of past procedures precluded the use of many of the better materials.

Thus, it is desirable to use very small amounts of the catalytic materials without sacrificing the performance of the electrode.

In the past, it has been the practice to coat the finished electrode with a semi-sealing agent to prevent the finer particles of the catalyst from dropping out of the electrode matrix. However, this can unduly inhibit the ionic or electrolytic transport between the electrode and the electrolyte of, for example, a fuel cell.

Electrodes made from carbon from a natural source are also plagued with the problem of wetting. Wetting is inherent with most finely porous low temperature electrodes made from such carbons. Wetting is a problem that results from the formation of more water during the reaction process than can be removed via the transport pores; as a result the micro-pores will fill and drown out. If there is a large amount of water, the electrode pores may be filled permanently, thus deactivating a large part of the internal area. The porous electrode material resulting from the carbonization of polyvinylidene chloride is free from the hydrophilic characteristics of carbon from a natural precursor as it is hydrophobic in nature. Thus, when polyvinylidene chloride is carbonized for use as a porous eelctrode the problem of wetting does not exist and wet proofing techniques can be eliminated.

When precursors of natural carbons are used in the production of a porous electrode a binder phase is required. This binder phase has been found to preferentially corrode from the conventional carbons in strong chemical environments. The two phase structure of conventional carbons arises from the use of petroleum coke or activated carbon as the carbon source, in combination with an easily carbonized binder, such as pitch or sugar. The porous material produced from the process of this invention is single phase in nature and thus free from the disadvantages of an heterogeneous, two phase structure of conventional carbons.

In the production of a battery electrode, the carbonized $(CH_2CCl_2)_x$ exhibits characteristics not obtainable in electrodes made from conventional carbons. A battery electrode, like a fuel cell electrode, must be electrically conductive and have good mechanical strength; carbonized $(CH_2CCl_2)_x$ has both these features. Carbons from natural sources, while they are electrically conductive, have a very poor mechanical strength characteristic. In the production of a battery electrode from conventional carbons the process is often not compatible with the battery active material. For example, if tungsten is used as the battery active material a high process temperature will cause the tungsten to precipitate into tungsten carbide. If copper is used for the battery active material the process temperature must be maintained below the 1083° F. melting point of copper.

Accordingly, it is an object of this invention to provide a process for producing a porous material from polyvinylidene chloride.

Another object of this invention is to provide a process for producing a porous carbon electrode from polyvinylidene chloride wherein the catalytic material is homogeneously distributed throughout.

A further object of this invention is to provide a process for producing a porous carbon electrode wherein the high surface area of the carbon acts as a catalyst extender.

Yet another object of this invention is to produce a porous carbon eelctrode from a mixture of polyvinylidene chloride and a catalyst material.

A still further object of this invention is to provide a method of making a battery electrode from polyvinylidene chloride.

Another object of this invention is to provide a method of making a porous material containing a catalyst for chemical reactions.

A further object of this invention is to provide a method of making a porous material having a substantially uniform pore structure.

Other objects and advantages will be apparent from the following description and the appended claims.

The versatility of polyvinylidene chloride as a precursor material for a porous electrode is evident when consideration is given to the number of activators that can be mixed with the polyvinylidene chloride to produce the desired catalytic action. Typical examples of these activator materials include, but are not limited to, the elements of the platinum group (Pt, Rh, Ru, Pd, Ir, Os), and the organometallic compounds of the platinum group. Other materials which have been successfully used in porous carbon electrodes include silver, gold, nickel, vanadium, uranium, titanium, iron, cobalt, manganese, and copper.

The initial step in the preparation of a porous carbon material from polyvinylidene chloride in accordance with present invention is mixing the catalyst material (i.e. one of the aforementioned activators) with the polyvinylidene chloride, the latter material being typically available in the form of small particles or spheres. Several approaches to catalyst mixing are suggested. One, the catalyst is mixed with the $(CH_2CCl_2)_x$ either dry or in a slurry. An example of the slurry method would be a mixture of one gram of chloroplatinic acid $(H_2PtCl_6)$ with 50 grams of polyvinylidene chloride in 200 ml. of water. A drop of nonionic wetting agent (Triton X-100) will aid in making the slurry. An example of a dry mixture would be the combining of 0.5 gram of platinous phthalocyanine,

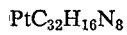
$PtC_{32}H_{16}N_8$ with 50 grams of polyvinylidene chloride. Another dry mixture would be combining 1 gram of carbon powder, prepared by pyrolyzing polyvinylidene chloride in accordance with the teachings of this invention and platinized by mixing with $(H_2PtCl_6)$ to give 10% by weight of platinum on the carbon, with 50 grams of $(CH_2CCl_2)_x$ spheres. The above examples of a mixture of the catalyst and $(CH_2CCl_2)_x$ are not intended to be exclusive but are given merely by way of example.

Another approach for combining the catalyst with the polyvinylidene chloride is dissolving each in mutually compatible solvents. An example of this approach would be dissolving chloroplatinic acid in phenol and dissolving the polyvinylidene chloride in dichlorobenzene. A typical mixture would be 50 grams of polyvinylidene chloride dissolved in 600 ml. of dichlorobenzene to which is added one gram of $H_2PtCl_6$ dissolved in phenol.

Any of the above methods of mixing the catalyst with the polyvinylidene chloride provides a homogeneous distribution of the catalyst thru the porous electrode. Also, the combining of a catalyst and the $(CH_2CCl_2)_x$ lessens the amount of catalyst metal required because the intrinsically high surface area of the carbon from pyrolyzed polyvinylidene chloride acts as a catalyst extender.

If the catalyst has been added to the polyvinylidene chloride by any of the above described slurry methods, the mixture must then be evaporated to dryness. A preferred method of removing the liquids would be by rotary evaporation since it tends to produce an unagglomerated powder as a residue. The rotary evaporation process can be carried out by simply rotating a flask over a source of heat and removing the vapor by means of a vacuum pump. The vapors drawn from the flask are condensed and reused or discarded.

Next the dried intimate mixture of $(CH_2CCl_2)_x$ and the catalyst are ground in a hammer mill using, for example, a 0.010 inch slotted screen. Since $(CH_2CCl_2)_x$ is plastic in nature, at room temperature the particles are not reduced in size by normal mechanical grinding, but are merely flattened. Thus, to grind the polyvinylidene chloride the mill and/or the material itself must be chilled. There are several ways that the chilling can be accomplished. For example, the material can be chilled by grinding chunks of solid $CO_2$ (Dry Ice) concurrently with the $(CH_2CCl_2)_x$ and the catalyst mixture. The mill itself could be chilled by feeding cryogenic nitrogen through the mill during the grinding operation. The polyvinylidene chloride and, as a matter of fact, many plastic materials, can be ground very effectively in the chilled condition.

If the polyvinylidene chloride and catalyst mixture have been reduced in size by grinding, the third step in the preparation of a porous carbon material is drying the ground mixture. Low temperature drying is necessary to prevent evolution of HCl from the polyvinylidene chloride. Satisfactory drying is obtained in a vacuum maintained between 25 and 30 inches Hg and at a temperature between 40° C. and 95° C. Preferentially, the drying should be carried out in a vacuum maintained between 28 and 30 inches Hg and at a temperature between 70° C. and 75° C.

The next step in the process of making a porous carbon material from polyvinylidene chloride comprises compacting the dry powder by either conventional die or hydrostatic compaction. Compaction of the dried ground mixture is carried out at a pressure in the range between 700 and 3500 p.s.i. The compacted material has sufficient green strength at this point to maintain a given shape during handling for subsequent steps in the process. Conventional carbons, however, have no green strength at this state of material preparation unless a binder has been added. An important feature of the compaction step is that the pore spectra and density of the finished carbon may be varied in a controlled manner by varying the particle size and compacting pressure. A carbon prepared from a polyvinylidene mixture pressed at 1300 p.s.i. has most of its pores between 3 and 8 microns average diameter while material pressed at 930 p.s.i. has a wider pore spectra, between 3 and 15 microns. The carbon made from material pressed at 2000 p.s.i. has a very narrow spectrum, between 1 and 4 microns. A narrow pore spectrum allows a gas-liquid interface to be established in a thin electrode, the thin electrode being necessary from mass transport considerations.

Next the compacted polyvinylidene chloride is carbonized by one of several methods. One method of carbonization of the compacted green material is by pyrolysis reaction. To pyrolyze the $(CH_2Cl_2)_x$, the compacted material is heated rapidly to 125° C. in a vacuum maintained between 29 and 30 inches of Hg; rapid heating is permissible at this stage because the decomposition reaction does not proceed at an appreciable rate until a temperature of 125° C. is exceeded. Care must be exercised to protect the pyrolyzing equipment from the HCl evolved during the reaction process. A simple and straight-forward way of protecting the equipment from the HCl vapors is by means of a liquid nitrogen trap.

After the compacted material has then reached the 125° C. temp. level, or thereabouts, the temperature is increased at a controlled rate until a final temperature somewhere between 175° C. and 182° C. is reached. The pressure of the reacting vessel should be a vacuum between 29–30 inches of Hg. It has been found that a temperature increase at the controlled rate of 10° C. per hour is satisfactory. Care must be exercised when the temperature approaches its final level since too high a temperature causes cracking of the compacted mass. However, it should be emphasized that the temperature must be high enough to insure that the carbonizing reaction takes place. The carbonizing reaction is given by the equation:

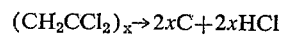
$(CH_2CCl_2)_x \rightarrow 2xC + 2xHCl$

The above reaction results in a weight loss of 40–50% in the temperature range of 175°–182° C. after a time of approximately 16 hours. Prolonged heating in this temperature range does not result in additional weight loss. A change in color from the original white of the $(CH_2CCl_2)_x$ to the characteristic black of carbon occurs at this stage of the process.

After the reaction has proceeded to where the weight of the material remains constant at a temperature in the 175° C. to 182° C. range, the compacted material is transferred to a furnace and heated in a vacuum, or inert atmosphere of argon or helium, for example, to a temperature in the range between 1000° C. and 1100° C. The rate of heating from the 175–182° C. reaction temperature to the 1000° C. to 1100° C. range can be as high as possible for the particular furnace employed. At this point there is little danger of the material cracking. This final baking process is maintained as long as necessary to complete pyrolyzing the polyvinylidene chloride to carbon, giving a total weight loss of 75%; the net residue is thus about 25% of the original PVDC. Although the 1100° C. temp. is not critical, care should be exercised not to substantially exceed this value since the maximum area, that is the surface area, of the finished porous materials may be reduced.

To produce a porous carbon material having substantially uniform macro-pores a pore-forming material is mixed with the polyvinylidene chloride and the catalyst material as part of the first step. There are several procedures for adding the poreforming material; one, a pore-forming material which either melts out of or vaporizes out of the body during the carbonization, or at a temperature slightly above, is added to the $(CH_2CCl_2)_x$ with the catalyst material. Several examples of pore-forming materials that vaporize during the carbonization step are polytetrafluorethylene and ammonium chloride. An example of a pore-forming material that melts during the carbonization is hexachlorobenzene.

Alternately, a soluble pore-forming material may be added to the $(CH_2CCl_2)_x$ with the catalyst material. This material is not removable during the carbonization step but is dissolved out after the carbonization by water or a suitable solvent.

The porous carbon material resulting from the use of a pore-forming material has an interconnected network of uniform continuous pores.

Where the $(CH_2CCl_2)_x$ and catalyst are combined in a slurry, it may be necessary to delay adding the pore-former if the solvent used with the pore-forming material is not compatible with the solvents of the slurry. In this case, the pore-forming material is added after evaporating the catalyst and $(CH_2CCl_2)_x$ solvents. The pore-forming solvent would then be removed by a second evaporation step.

There are a number of uses for the porous carbon material prepared by the foregoing process. Several of the more important uses are for fuel-cell electrodes, and catalysts for mild chemical reactions. A fuel-cell electrode was prepared from the examples given previously. These electrodes serve the function of containing the gas-liquid-solid interface and, ideally, should contain large macro-pores and small micro-pores. The carbonized $(CH_2CCl_2)_x$ has a disordered structure resulting in small micro-pores and thus contains a large number of sites for catalytic action. A fuel-cell electrode produced by the previously described process will be long lived, will not contaminate the fuel-cell electrolyte, and will not allow energy losses due to undesirable side reactions. The platinum family of metals supported on carbon are used in a number of applications as catalysts under mild reaction conditions in the chemical industry. As an example, nitrobenzene is reduced with platinum on carbon to p-hydroxyaniline in the presence of strong sulfuric acid. In the presence of anhydrous hydrogen fluoride, p-fluoraniline is produced. Carbonized polyvinylidene chloride is ideally suited for such applications due to its outstanding chemical stability in the presence of acids and its high surface area.

Another important use for pyrolyzed polyvinylidene chloride is battery electrodes for aqueous and non-aqueous electrolytes. The method of making a porous carbon material for a battery electrode is essentially the same as for preparing a material for a fuel cell electrode. In the first step, however, a battery active material is mixed with the polyvinylidene instead of a catalyst; either a slurry or a dry mix process can be used. For a molten salt electrolyte battery, using a dry mix technique, 50 grams of tungsten powder (1 micron average diameter) is dry mixed with 100 grams of polyvinylidene chloride. When the dry mix technique is used the polyvinylidene chloride can be chill ground prior to mixing or after mixing with the battery active material. In the slurry technique, the 50 grams of tungsten powder and the 100 grams of $(CH_2CCl_2)_x$ are mixed with 400 ml. of chloroform. The solvent is then removed by the rotary evaporation process described previously. For a battery electrode, the evaporated mixture may be chill-ground with solid $CO_2$, if needed for homogeneity, or used directly from the evaporator.

After the mixing, drying, and grinding, if the latter is desired, the mixture is compacted and pyrolyzed by the process described heretofore. During the carbonization of the $(CH_2CCl_2)_x$, the HCl evolved from the polyvinylidene chloride leaves a porous material that is ideally suited for a battery electrode. The minute particles of the battery active material are dispersed throughout the porous material and accessible to the battery electrolyte by means of the porous structure caused by the HCl evolution. The HCl also cleans the minute particles of the battery active material as it evolves from the polyvinylidene chloride. The result is a battery electrode with a high weight percentage of clean battery active material easily accessible to the battery electrolyte. It is possible that the resulting carbon-tungsten electrode can have as much as 85% by weight of tungsten intimately dispersed thru the electrically conductive, mechanically strong, carbon matrix. The amount of battery active material in a finished electrode can range from 18 to 85% by weight; but it is preferred that the weight be maintained between 50 and 75% since greater percentages of the active material tend to lower the mechanical strength of the electrode.

The battery active material for use in the above process must withstand the pyrolyzing environment; i.e., 1000° C. temperatures and HCl vapors. This excludes metals forming volatile chloride below 1000° C. or having a melting point below 1000° C.

Other materials than tungsten may be used as the battery active material.

The above process may also be used in the preparation of an electrode for non-aqueous electrolyte batteries. A typical preparation is 50 grams of minus 325 mesh copper powder. This material is dry mixed with 100 grams of chill-ground polyvinylidene chloride powder; dry mixing gives an adequate homogenous mixture since the density difference between the two powders is small. The mixture is compacted and pyrolyzed to a temperature not exceeding 1000° C. by the previously described process. With the amounts given above, the finished electrode will have approximately 67% by weight of copper intimately dispersed thru the electrically conductive, mechanically strong, carbon matrix.

Obviously, many modifications and variations of the present invention as hereinbefore set forth may be made without departing from the sphere and scope thereof and therefore only such limitations should be imposed as are indicated in the appended claims.

We claim:

1. The method of making a porous and monolithic carbon body having a metallic activator or the like uniformly distributed throughout the body, comprising the steps of:

preparing a dry, uniform mixture of particles of polyvinylidene chloride and a desired activator in the approximate ratio of not more than one part of metallic activator to two parts of polyvinylidene chloride, by weight;

compacting the mixture to provide a desired form in a green body; and carbonizing the polyvinylidene chloride in the green body to produce carbon, whereby the metallic activator is uniformly distributed through the monolithic carbon body, wherein the source of substantially all of the carbon is polyvinylidene chloride.

2. The method as claimed in claim 1 wherein the activator is initially chemically bonded with at least one element such that the bonded elements in combination are nominally described as a precursor for the activator, and including the additional step of freeing the activator from the precursor after the mixture is prepared, wherein the source of substantially all of the carbon is polyvinylidene chloride.

3. The method as claimed in claim 1 and including the further step of passing the particles through a sieve before compaction in order to provide substantially all particles at a size of 0.010 inch or less.

4. The method as claimed in claim 1 wherein the compacting step is accomplished at room temperature.

5. The method of making a porous carbon material as claimed in claim 1 wherein the metallic activator is an element selected from the group consisting of silver, gold, nickel, and their catalytic alloys.

6. The method of making a porous carbon material as claimed in claim 1 wherein before carbonization the metallic activator is in the form of an organometallic compound of the platinum group metals.

7. The method of making a porous carbon material as claimed in claim 1 wherein the desired activator is platinum, and including the additional steps of:

dissolving an organometallic compound of the platinum group with dichlorobenzene;

mixing polyvinylidene chloride in the dichlorobenzene solution; and evaporating the dichlorobenzene solution to provide a dry, uniform mixture of particles of polyvinylidene chloride and the organometallic compound.

8. The method of making a porous carbon material as claimed in claim 1 wherein the desired activator is a metal of the platinum group, and including the additional steps of:

dissolving a metal of the platinum group in a solvent which is miscible with dichlorobenzene;

mixing polyvinylidene chloride and dichlorobenzene;

adding the dissolved platinum group metal to the mixture of polyvinylidene chloride and dichlorobenzene; and evaporating the solvents to provide a dry, uniform mixture of particles of polyvinylidene chloride and the metal.

9. The method of making a carbon body as claimed in claim 1 wherein the metallic activator is a battery-active material, and including the additional steps of:

initially mixing particles of a battery-active material and polyvinylidene chloride with chloroform; and evaporating the solvents from said mixture to provide a dry, uniform mixture of said particles.

10. The method of making a battery electrode, comprising the steps of:

preparing a uniform mixture of particles of polyvinylidene chloride and a battery-active material in the approximate ratio of two parts of polyvinylidene chloride to not more than one part of battery-active material, by weight;

drying the mixture to remove substantially all water;

compacting the mixture at a pressure to give a desired pore spectra; and pyrolyzing the compacted mixture in a non-oxidizing atmosphere until the polyvinylidene chloride yields carbon, wherein the source of substantially all of the carbon is polyvinylidene chloride.

11. The method of making a battery electrode as set forth in claim 10 wherein the battery active material is selected from the group consisting of tungsten, tantalum, and copper.

12. The method of making a battery electrode as set forth in claim 10 wherein the battery active material is a tungsten precursor.

13. The method of making a battery electrode as set forth in claim 10 wherein the battery active material is a tantalum precursor.

14. The method of making a battery electrode as set forth in claim 10 wherein the battery active material is a copper precursor.

15. The method of making a battery electrode as set forth in claim 10 wherein the battery-active material is a material selected from the group of metals including tungsten, silver, gold, copper, and precursors for said metals.

16. The method of making a monolithic and porous carbon material having particles of an element of the platinum group homogeneously distributed throughout the material, comprising the steps of:

preparing a uniform mixture of particles of polyvinylidene chloride and an element of the platinum group in the ratio of not more than one part of metal particles to two parts of polyvinylidene chloride, by weight;

drying the mixture to remove substantially all water;

compacting the mixture at a pressure to give a desired pore spectra; and subsequently carbonizing the polyvinylidene chloride to convert it to carbon and gas, wherein the source of substantially all of the carbon is polyvinylidene chloride.

17. The method of making a monolithic and porous carbon material having a catalyst for a chemical process uniformly distributed throughout the material, comprising the steps of:

preparing a uniform mixture of particles of polyvinylidene chloride, a catalyst for a chemical process in a quantity not greater than one part of catalyst to two parts of polyvinylidene chloride, by weight, and a pore-forming material;

drying the mixture to remove substantially all water;

compacting the mixture to provide a desired shape; and pyrolyzing the compacted mixture in a non-oxidizing atmosphere to vaporize the pore-forming material and convert the polyvinylidene chloride to carbon and gas, wherein the source of substantially all of the carbon is polyvinylidene chloride.

18. The method of making a monolithic and porous carbon material having a catalyst for a chemical process uniformly distributed throughout the material, comprising the steps of:

preparing a uniform mixture of particles of polyvinylidene chloride, a catalyst for a chemical process in a quantity not greater than one part of catalyst to two parts of the polyvinylidene chloride, by weight, and a soluble pore-forming material;

drying the mixture to remove substantially all water;

compacting the mixture to provide a shapded form;

dissolving the pore-forming material and removing it from the mixture; and pyrolyzing the compacted mixture in a non-oxidizing atmosphere until the polyvinylidene chloride yields carbon, wherein the source of substantially all of the carbon is polyvinylidene chloride.

19. The method of making a monolithic carbonaceous material containing therein a uniformly dispersed catalyst, comprising the steps of:

preparing a dry, uniform mixture of particles of polyvinylidene chloride and a catalyst in the ratio of not more than one part of the catalyst to two parts of polyvinylidene chloride, by weight;

compacting the dry mixture to provide a shaped form; and subsequently pyrolyzing the mixture in a non-oxidizing atmosphere until the polyvinylidene chloride yields carbon, wherein the source of substantially all of the carbon is polyvinylidene chloride.

20. The method of making a battery electrode, comprising the steps of:
mixing particles of a battery-active material with polyvinylidene chloride in the ratio of about one part of battery-active material to two parts of polyvinylidene chloride, by weight;
grinding the mixture in a chilled state;
drying the mixture to remove substantially all water;
compacting the dry, ground mixture to produce the desired pore spectra and density; and
pyrolyzing the compacted mixture in a protective atmosphere until the polyvinylidene chloride yields carbon, whereby the battery-active material is homogeneously distributed throughout the electrode, wherein the source of substantially all of the carbon is polyvinylidene chloride.

21. The method of making a battery electrode, comprising the steps of:
preparing a dry, uniform mixture of particles of a battery-active material with polyvinylidene chloride in the approximate ratio of two parts of polyvinylidene chloride to not more than one part of battery-active materials by weight;
compacting the mixture to produce the desired pore spectra and density;
heating the compacted mixture at a slow rate in a protective atmosphere to control the reaction $$(CH_2CCl_2)_x \rightarrow 2xC + 2xHCl$$

for as long as the mixture is not substantially rigid; and
rapidly heating the compacted mixture in a protective atmosphere after said mixture is substantially rigid until the polyvinylidene chloride is fully converted to carbon and gas, whereby the battery-active material is homogeneously distributed throughout the carbon matrix, wherein the source of substantially all of the carbon is polyvinylidene chloride.

22. The method of making a porous electrode from polyvinylidene chloride which comprises:
dissolving an organometallic compound of the platinum group with dichlorobenzene;
mixing polyvinylidene chloride in the dichlorobenzene solution;
evaporating the solvents from the mixture of polyvinylidene chloride and dichlorobenzene;
grinding the mixture of polyvinylidene chloride and the organometallic compound from the platinum group, after evaporation;
compacting the ground mixture to produce the desired pore spectra and density;
heating the compacted mixture at a controlled rate to control the reaction $(CH_2CCl_2)_x \rightarrow 2xC + 2xHCl$ until the mixture has experienced a loss of about 40% by weight; and rapidly heating the compacted mixture after the reaction $(CH_2CCl_2)_x \rightarrow 2C + 2xHCl$ has reached a predetermined level of completion, the source of substantially all of the carbon in the resultant product being the carbon produced in said reaction.

23. The method of claim 22 wherein the heating of the compacted mixture recited in the last-mentioned step is carried out in a vacuum at about 1000° C.

24. The method of claim 22 wherein the evaporated mixture is cryogenically ground.

25. The method of making a fuel cell electrode from polyvinylidene chloride which comprises the steps of:
preparing a powdered mixture of polyvinylidene chloride and chloroplatinic acid in the ratio of at least one part of chloroplatinic acid to fifty parts of polyvinylidene chloride, by weight;
chilling the mixture of polyvinylidene chloride and chloroplatinic acid by intimately mixing it with chunks of solid $CO_2$;
grinding the chilled mixture;
drying the ground mixture under a vacuum at a temperature low enough to prevent evolution of HCl from the ground mixture;
forming a desired electrode shape by compacting the dry mixture at a pressure in the range between about 700–3500 p.s.i;
heating the compacted mixture in a protective atmosphere at a slow rate below about 182° C. to control the reaction $(CH_2CCl_2)_x \rightarrow 2xC + 2xHCl$ until the mixture has experienced a weight loss of about 40%; and
subsequently heating the compacted mixture in a protective atmosphere at a temperature in the range between about 1,000° C. and 1100° C. until pyrolysis of polyvinylidene chloride to carbon is complete, wherein the source of substantially all of the carbon is polyvinylidene chloride.

26. The method as claimed in claim 25 wherein the mixture preparation is accomplished by:
dissolving polyvinylidene chloride in a first solvent and chloraplatinic acid in a second solvent which is miscible with the first solvent;
subsequently mixing the solvents; and
evaporating the mixed solvents to leave a powdered mixture of polyvinylidene chloride and chloroplatinic acid.

References Cited

UNITED STATES PATENTS

| | | | |
|---|---|---|---|
| 3,077,508 | 2/1963 | Oswin | 136—122 |
| 3,212,930 | 10/1965 | Thompson et al. | 136—86 |
| 3,258,363 | 6/1966 | Lieb | 136—86 |
| 3,279,950 | 10/1966 | Kordesch | 136—86 |
| 3,291,753 | 12/1966 | Thompson | 252—447 |
| 3,320,093 | 5/1967 | Harding | 136—122 |
| 3,346,421 | 10/1967 | Thompson | 136—120 |
| 3,385,736 | 5/1968 | Deibert | 136—86 |
| 3,395,049 | 7/1968 | Thompson | 136—86 |
| 3,413,152 | 10/1968 | Folkins | 136—86 |

ALLEN B. CURTIS, Primary Examiner

P. D. ROSENBERG, Assistant Examiner